United States Patent
Banach et al.

(10) Patent No.: US 12,006,215 B2
(45) Date of Patent: Jun. 11, 2024

(54) METHOD OF CARBONIZATE PURIFICATION

(71) Applicant: SYNTOIL SPÓŁKA AKCYJNA, Wroclaw (PL)

(72) Inventors: Marcin Banach, Proszowice (PL); Jolanta Pullit-Prociak, Michałowice (PL)

(73) Assignee: SYNTOIL SPOLKA AKCYJNA, Wroclaw (PL)

( * ) Notice: Subject to any disclaimer, the term of this patent is extended or adjusted under 35 U.S.C. 154(b) by 724 days.

(21) Appl. No.: 17/048,589

(22) PCT Filed: Apr. 15, 2019

(86) PCT No.: PCT/IB2019/053077
§ 371 (c)(1),
(2) Date: Oct. 17, 2020

(87) PCT Pub. No.: WO2019/202465
PCT Pub. Date: Oct. 24, 2019

(65) Prior Publication Data
US 2021/0155482 A1    May 27, 2021

(30) Foreign Application Priority Data
Apr. 17, 2018  (PL) .......................... 425261

(51) Int. Cl.
*C01B 32/05*    (2017.01)
(52) U.S. Cl.
CPC .......... *C01B 32/05* (2017.08); *C01P 2004/61* (2013.01); *C01P 2006/80* (2013.01)

(58) Field of Classification Search
CPC ...................................................... C01B 32/05
See application file for complete search history.

(56) References Cited

U.S. PATENT DOCUMENTS

| | | |
|---|---|---|
| 3,998,604 A | 12/1976 | Hinkley |
| 4,613,429 A | 9/1986 | Chiang et al. |
| 4,618,346 A | 10/1986 | Schapiro et al. |
| 2004/0253166 A1* | 12/2004 | Kruesi .................... C01B 32/05 423/445 R |

FOREIGN PATENT DOCUMENTS

| | | |
|---|---|---|
| CN | 102041128 A | 5/2011 |
| EP | 0302864 B1 | 8/1991 |
| WO | 2005033213 A2 | 4/2005 |

* cited by examiner

*Primary Examiner* — Stuart L Hendrickson
(74) *Attorney, Agent, or Firm* — Andrzej Malarz, Esq.

(57) ABSTRACT

A method of purification of carbonizate resulting from the thermal recycling process of rubber waste consists in that the carbonizate is mixed with sodium bicarbonate, then deionized water having increased temperature and strong mineral acid and/or mixture of mineral acids are introduced into the obtained mixture, and next the whole is stirred at increased temperature, and filtered at decreased pressure while washing with deionized water having increased temperature, the filtrate is discarded, the solution of a strong base is introduced into the solid residue, and the whole is stirred at increased temperature, then the obtained suspension is filtered at decreased pressure, and washed with deionized water having increased temperature, and next the filtrate is discarded, and the solid residue is dried.

19 Claims, No Drawings

METHOD OF CARBONIZATE PURIFICATION

TECHNICAL FIELD

The object of the present invention is a method of purification of carbonizate resulting from the thermal recycling process of rubber waste.

BACKGROUND ART

Carbonizate is a residue from the thermal recycling process of rubber waste, in particular pyrolytic processes. Three types of products are obtained as their result. These are: oils rich in aromatic compounds, gas of high calorific value, and solid residue (carbonizate). Gas may be burned at conventional gas burner. The oils may be fractionated, and as a result kerosene fraction and light and heavy oils are obtained. The solid residue comprises mainly carbon, fillers, and organic additives improving properties of rubber products and moist. As a result, the content of ash in raw carbonizate is varied, and amounts of specific components may vary. Therefore the content of ash in raw carbonizate is higher than in technical soot, and is approximately 18%. Composition of the ash is varied, and the amount of specific components may vary. The ash is composed of: zinc oxide (ZnO), silicon oxide ($SiO_2$), aluminum oxide ($Al_2O_3$) and calcium oxide (CaO). Following components are also met: sodium oxide ($Na_2O$), iron (III) oxide ($Fe_2O_3$), magnesium oxide (MgO), potassium oxide ($K_2O$) and others. These materials are added to rubber products because of their physicochemical properties, and their beneficial mutual interaction with other components of those products. Additionally hardeners (accelerants of vulcanization processes), peptizators, binders, preservatives (antioxidants, waxes) and others are added to those products. It is aimed at ensuring wide range of mechanical properties of the final rubber products e.g. tyres.

Because of the fact that increased content of the ash results in limited possibility of use of raw carbonizate in processes of its recycling or other applications (adsorption, catalysis), it is particularly important to maximally remove mineral part. The presence of metal oxides on the surface of the carbon would significantly deteriorate its functional properties. Therefore reduction of ash content would significantly improve the market value of the carbonizate.

A process for demineralizing coal comprising the steps of forming its alkaline solution, which solution has an alkali content of from 5 to 30% by weight is known from patent specification EP0302864B1. The mixture is maintained in hydrothermal conditions at a temperature of from 150 to 300° C. for 2-20 minutes, then it is rapidly cooled to temperature <100° C. Then the mixture is filtered, and separated leach may be reused. Solid residue is washed thoroughly with distilled water and mixed with aqueous solution of sulphuric acid of concentration of 0.1 M obtaining suspension having pH from 0.5 to 1.5. The whole is stirred for 45 min. Then the solution is separated by filtration, next the products shall be thoroughly washed with distilled water. The content of ash in dried product is 0.5%.

The patent specification U.S. Pat. No. 3,998,604A discloses a method of demineralization of coal slurry by its treatment with aqueous solutions of strong acids such as HCl, $H_2SO_4$ and $H_2CO_3$ and by conducting froth flotation in the presence of a gas selected from following gases: $Cl_2$, $SO_2$ and $CO_2$.

The patent specification U.S. Pat. No. 4,618,346A discloses a process of deashing of coal where first step is wetting the coal with alcohol solution e.g. methanol. Then at increased temperature the wetted coal is treated with a mineral acid solution e.g. HCl or HF. In the following step the demineralized coal is neutralized with ammonia water and/or boric acid. The demineralized coal is neutralized, washed and dried. The product contains less than 1% of ash.

The patent specification U.S. Pat. No. 4,613,429A discloses a process of deashing feed coal by employment of liquid carbon dioxide. First water solution of coal is prepared, and then mixed with liquid carbon dioxide. The authors claim that zeolite coal accumulates in liquid carbon dioxide, and mineral substances go to aqueous phase. After separation of both phases, the product is obtained having reduced content of ash.

The patent specification CN102041128A discloses a method of reduction of mineral part in the coal consisting in its treatment with the mixture of hydrochloric acid with at least one inorganic acid, wherein the mass percentage content of the HCl acid is 5-30%, the mass percentage content of other inorganic acids is 10-40%. The process is carried out at the range of temperatures from 10 to 80° C. from 4 to 24 h. After filtration and washing of solid residue, the product is obtained having content of ash approx. 1%. The authors claim, that the method may be used in order to deash bigger particles of coal, having even 5 mm.

The patent specification WO2005033213 discloses a method of refining carbonizate derived from the pyrolysation of rubber tyres, which consists in washing the carbonizate with hydrochloric acid and then washing with basic solution.

DISCLOSURE OF THE INVENTION

A method of purification of carbonizate resulting from the thermal recycling process of rubber waste according to the invention is characterized in that the carbonizate is mixed with sodium bicarbonate, then deionized water having increased temperature and strong mineral acid and/or mixture of mineral acids are introduced into the obtained mixture, and next the whole is stirred at increased temperature, filtered at decreased pressure while washing with deionized water having increased temperature, the filtrate is discarded, the solution of a strong base is introduced into the solid residue, and the whole is stirred at increased temperature, then the obtained suspension is filtered at decreased pressure, and washed with deionized water having increased temperature, and then the filtrate is discarded, and the solid residue is dried.

Mixing of carbonizate with sodium bicarbonate is carried out wet or dry. Preferentially mixing is carried out in a ball mill.

Mixing of carbonizate with sodium bicarbonate is carried from 10 to 100 min.

The hydrochloric acid and/or sulphuric (IV) acid and/or hydrofluoric acid or their mixture is used as a strong mineral acid.

The granulation of the carbonizate is from 0.02 to 0.3 mm.

The mass ratio of sodium bicarbonate to carbonizate is from 0.3 to 1.5.

The mass ratio of hydrochloric acid to raw carbonizate is from 0.5 to 2.0.

The concentration of hydrochloric acid in the reaction mixture is from 2 to 10%.

The mass ratio of sulphuric (IV) acid to carbonizate is from 2 to 10.

The concentration of sulphuric (IV) acid in the reaction mixture is from 13 to 40%.

The mass ratio of hydrofluoric acid to carbonizate is from 1 to 5.

The concentration of hydrofluoric acid in the reaction mixture is from 7 to 20%.

The strong base used is sodium hydroxide, ammonia water and/or their mixture.

The mass ratio of sodium hydroxide to carbonizate is from 5 to 15.

The concentration of sodium hydroxide in the etching solution is from 30 to 50%.

The mass ratio of ammonia to raw carbonizate is from 0.5 to 2.

The concentration of ammonia in the etching solution is from 1 to 25%.

The temperature of mixing the carbonizate with the acid solution or mixture of acids solution is from 70 to 95° C.

The time of stirring the mixture of carbonizate with sodium bicarbonate and the solution of acid and/or mixture of mineral acids and the solution of base or mixture of bases is from 15 to 90 min.

The solid residue is dried at the temperature from 90 to 120° C.

EXAMPLES

The following examples illustrates the invention.

Example 1

4 g of raw carbonizate having ash content of 18% and granulation ≤0.063 mm is dry mixed with 2.67 g of sodium bicarbonate in a ball mill at vibration frequency 30 rpm during 60 min. 5 g of the obtained mixture is transferred to the reaction vessel, into which it is introduced 50 $cm^3$ of deionized water having temperature 90° C. and 7.5 $cm^3$ of hydrochloric acid having concentration 36.5%. The whole is stirred mechanically while maintaining temperature 90° C. for 60 min. Then the suspension is filtered under decreased pressure. The solid residue is washed with 1 $dm^3$ of deionized water having temperature 90° C. The filtrate is discarded, and the solid residue is transferred to the reaction vessel, into which 50 $cm^3$ of aqueous solution of sodium hydroxide having concentration of 40% is introduced. The whole is stirred mechanically while maintaining temperature 90° C. for 60 min. Then the suspension is filtered under decreased pressure. The filtrate is discarded, and the solid residue is washed with 1.5 $dm^3$ of deionized water having temperature 90° C., and then it is dried in a chamber dryer at the temperature 105° C. for 24 h. Carbon product is obtained having decreased ash content of 1.3%.

Example 2

4 g of raw carbonizate having ash content of 18% and granulation ≤0.063 mm is dry mixed with 2.67 g of sodium bicarbonate in a ball mill at vibration frequency 30 rpm during 60 min. 5 g of the obtained mixture is transferred to the reaction vessel, into which it is introduced 50 $cm^3$ of deionized water having temperature 90° C. and 7.5 $cm^3$ of hydrochloric acid having concentration 36.5%. The whole is stirred mechanically while maintaining temperature 90° C. for 30 min. Then the suspension is filtered under decreased pressure. The solid residue is washed with 0.5 $dm^3$ of deionized water having temperature 90° C. The filtrate is discarded, and the solid residue is transferred to the reaction vessel, into which it is introduced 50 $cm^3$ of deionized water having temperature 90° C. and 5 $cm^3$ of sulphuric (IV) acid having concentration 95%. The whole is stirred mechanically while maintaining temperature 90° C. for 30 min. Then the suspension is filtered under decreased pressure. The solid residue is washed with 1 $dm^3$ of deionized water having temperature 90° C. The filtrate is discarded, and the solid residue is transferred to the reaction vessel, into which it is introduced 50 $cm^3$ of aqueous solution of sodium hydroxide having concentration of 40% and 10 $cm^3$ of ammonia water having concentration of 25%. The whole is stirred mechanically while maintaining temperature 90° C. for 30 min. Then the suspension is filtered under decreased pressure, the filtrate is discarded, and the solid residue is washed with 1.5 $dm^3$ of deionized water having temperature 90° C., and then it is dried in a chamber dryer at the temperature 105° C. for 24 h. Carbon product is obtained having decreased ash content of 1.6%.

Example 3

4 g of raw carbonizate having ash content of 18% and granulation ≤0.063 mm is dry mixed with 2.67 g of sodium bicarbonate in a ball mill at vibration frequency 30 rpm during 60 min. 5 g of the obtained mixture is transferred to the reaction vessel, into which it is introduced 50 $cm^3$ of deionized water having temperature 90° C. and 7.5 $cm^3$ of hydrochloric acid having concentration 36.5%. The whole is stirred mechanically while maintaining temperature 90° C. for 30 min. Then the suspension is filtered under decreased pressure. The solid residue is washed with 1 $dm^3$ of deionized water having temperature 90° C. The filtrate is discarded, and the solid residue is transferred to the reaction vessel, into which 20 $cm^3$ of aqueous solution of ammonia water having concentration of 25% is introduced. The whole is stirred mechanically while maintaining temperature 90° C. for 30 min. The suspension is filtered under decreased pressure, the filtrate is discarded, and the solid residue is washed with 1.5 $dm^3$ of deionized water having temperature 90° C., and then it is dried in a chamber dryer at the temperature 105° C. for 24 h. Carbon product is obtained having decreased ash content of 12.9%.

Example 4

4 g of raw carbonizate having ash content of 18% and granulation ≤0.063 mm is dry mixed with 2.67 g of sodium bicarbonate in a ball mill at vibration frequency 30 rpm during 60 min. 5 g of the obtained mixture is transferred to the reaction vessel, into which it is introduced 50 $cm^3$ of deionized water having temperature 90° C. and 7.5 $cm^3$ of hydrochloric acid having concentration 36.5%. After 10 minutes 3 $cm^3$ of hydrofluoric acid having concentration 40% is introduced. The whole is stirred mechanically while maintaining temperature 90° C. for 20 min. After this time, 9 $cm^3$ of hydrochloric acid having concentration 36.5% is introduced portion by portion, and the whole is stirred for next 30 min. Then the suspension is filtered under decreased pressure. The solid residue is washed with 1 $dm^3$ of deionized water having temperature 90° C. The filtrate is discarded, and the solid residue is transferred to the reaction vessel, into which it is introduced 50 $cm^3$ of aqueous solution of sodium hydroxide having concentration of 40%. The whole is stirred mechanically while maintaining temperature 90° C. for 30 min. The suspension is filtered under decreased pressure, the filtrate is discarded, and the solid residue is washed with 1.5 $dm^3$ of deionized water having temperature 90° C., and then it is dried in a chamber dryer at the temperature 105° C. for 24 h. Carbon product is obtained having decreased ash content of 1.3%.

Example 5

4 g of raw carbonizate having ash content of 18% and granulation ≤0.063 mm is dry mixed with 2.67 g of sodium bicarbonate in a ball mill at vibration frequency 30 rpm during 60 min. 5 g of the obtained mixture is transferred to the reaction vessel, into which it is introduced 50 cm$^3$ of deionized water having temperature 90° C. and 7.5 cm$^3$ of hydrochloric acid having concentration 36.5%. The whole is stirred mechanically while maintaining temperature 90° C. for 20 min. After this time, at intervals of 20 minutes, two portions of 2 cm$^3$ each of hydrochloric acid having concentration 36.5% are introduced. Then the suspension is filtered under decreased pressure. The solid residue is washed with 1 dm$^3$ of deionized water having temperature 90° C. The filtrate is discarded, and the solid residue is transferred to the reaction vessel, into which it is introduced 50 cm$^3$ of aqueous solution of sodium hydroxide having concentration of 40%. The whole is stirred mechanically while maintaining temperature 90° C. for 60 min. The suspension is filtered under decreased pressure, the filtrate is discarded, and the solid residue is washed with 1.5 dm$^3$ of deionized water having temperature 90° C., and then it is dried in a chamber dryer at the temperature 105° C. for 24 h. Carbon product is obtained having decreased ash content of 0.8%.

Example 6

4 g of raw carbonizate having ash content of 18% and granulation ≤0.063 mm is dry mixed with 2.67 g of sodium bicarbonate in a ball mill at vibration frequency 30 rpm during 60 min. 5 g of the obtained mixture is transferred to the reaction vessel, into which it is introduced 50 cm$^3$ of deionized water having temperature 90° C. and 7.5 cm$^3$ of hydrochloric acid having concentration 36.5%. The whole is stirred in the water-bath maintaining temperature 90° C. for 30 min. Then the suspension is filtered under decreased pressure. The solid residue is washed with 0.5 dm$^3$ of deionized water having temperature 90° C. The filtrate is discarded, and the solid residue is transferred to the reaction vessel, into which it is introduced 50 cm$^3$ of deionized water having temperature 90° C. and 5 cm$^3$ of hydrosulphuric acid having concentration 95%. The whole is stirred mechanically while maintaining temperature 90° C. for 15 min. Then the suspension is filtered under decreased pressure. The solid residue is washed with 1 dm$^3$ of deionized water having temperature 90° C. The filtrate is discarded, and the solid residue is transferred to the reaction vessel, into which it is introduced 50 cm$^3$ of aqueous solution of sodium hydroxide having concentration of 40% and 10 cm$^3$ of ammonia water having concentration of 25%. The whole is stirred mechanically while maintaining temperature 90° C. for 15 min. The suspension is filtered under decreased pressure, the filtrate is discarded, and the solid residue is washed with 1.5 dm$^3$ of deionized water having temperature 90° C., and then it is dried in a chamber dryer at the temperature 105° C. for 24 h. Carbon product is obtained having decreased ash content of 0.9%.

Example 7

4 g of raw carbonizate having ash content of 18% and granulation ≤0.063 mm is dry mixed with 2.67 g of sodium bicarbonate in a ball mill at vibration frequency 30 rpm during 60 min. 5 g of the obtained mixture is transferred to the reaction vessel, into which it is introduced 50 cm$^3$ of deionized water having temperature 90° C. and 7.5 cm$^3$ of hydrochloric acid having concentration 36.5%. The whole is stirred mechanically while maintaining temperature 90° C. for 20 min. After this time 10 cm$^3$ of sulphuric (IV) acid having concentration 95% is introduced into the mixture, and the whole is stirred for next 20 min. After this time 10 cm$^3$ of hydrofluoric acid having concentration 70% is introduced into the mixture, and the whole is stirred for next 20 min. Then the suspension is filtered under decreased pressure. The solid residue is washed with 1 dm$^3$ of deionized water having temperature 90° C. The filtrate is discarded, and the solid residue is transferred to the reaction vessel, into which it is introduced 50 cm$^3$ of aqueous solution of sodium hydroxide having concentration of 40%. The whole is stirred mechanically while maintaining temperature 90° C. for 60 min. The suspension is filtered under decreased pressure, the filtrate is discarded, and the solid residue is washed with 1.5 dm$^3$ of deionized water having temperature 90° C., and then it is dried in a chamber dryer at the temperature 105° C. for 24 h. Carbon product is obtained having decreased ash content of 1.6%.

The invention claimed is:

1. A method of purification of carbonizate resulting from the thermal recycling process of rubber waste, characterized in that the carbonizate is mixed with sodium bicarbonate, then deionized water having increased temperature and strong mineral acid and/or mixture of mineral acids are introduced into the obtained mixture, and next the whole is stirred at increased temperature from 70 to 95° C., and filtered at decreased pressure while washing with deionized water having increased temperature, the filtrate is discarded, the solution of a strong base is introduced into the solid residue, and the whole is stirred at increased temperature, then the obtained suspension is filtered at decreased pressure, and washed with deionized water having increased temperature, and next the filtrate is discarded, and the solid residue is dried.

2. The method according to claim 1, characterized in that the mixing of carbonizate with sodium bicarbonate is carried out wet or dry.

3. The method according to claim 2, characterized in that the mixing of carbonizate with sodium bicarbonate is carried from 10 to 100 minutes.

4. The method according to claim 1 characterized in that the hydrochloric acid or sulphuric (IV) acid and/or hydrofluoric acid and/or their mixture is used.

5. The method according to claim 1, characterized in that the granulation of the carbonizate is from 0.02 to 0.3 millimeters.

6. The method according to claim 1, characterized in that the mass ratio of sodium bicarbonate to carbonizate is from 0.3 to 1.5.

7. The method according to claim 1, characterized in that the mass ratio of hydrochloric acid to raw carbonizate is from 0.5 to 2.0.

8. The method according to claim 1, characterized in that the concentration of hydrochloric acid in the reaction mixture is from 2 to 10%.

9. The method according to claim 1, characterized in that the mass ratio of sulphuric (IV) acid to carbonizate is from 2 to 10.

10. The method according to claim 1, characterized in that the concentration of sulphuric (IV) acid in the reaction mixture is from 13 to 40%.

11. The method according to claim 1, characterized in that the mass ratio of hydrofluoric acid to carbonizate is from 1 to 5.

12. The method according to claim 1, characterized in that the concentration of hydrofluoric acid in the reaction mixture is from 7 to 20%.

13. The method according to claim 1, characterized in that the strong base used is sodium hydroxide, ammonia water and/or their mixture.

14. The method according to claim 1, characterized in that the mass ratio of sodium hydroxide to carbonizate is from 5 to 15.

15. The method according to claim 1, characterized in that the concentration of sodium hydroxide in the etching solution is from 30 to 50%.

16. The method according to claim 1, characterized in that the mass ratio of ammonia to raw carbonizate is from 0.5 to 2.

17. The method according to claim 1, characterized in that the concentration of ammonia in the etching solution is from 1 to 25%.

18. The method according to claim 1, characterized in that the time of stirring the mixture of carbonizate with sodium bicarbonate with the solution of acid and/or mixture of mineral acids and with the solution of base and/or mixture of bases is from 15 to 90 minutes.

19. The method according to claim 1, characterized in that the solid residue is dried at the temperature from 90 to 120° C.

\* \* \* \* \*